United States Patent [19]

Stockdale

[11] 4,026,409
[45] May 31, 1977

[54] HELICAL STORAGE AND CONVEYING UNIT

[75] Inventor: Thomas C. Stockdale, Warren, Mich.

[73] Assignee: F. Jos. Lamb Company, Warren, Mich.

[22] Filed: May 14, 1976

[21] Appl. No.: 686,412

[52] U.S. Cl. .............................. 198/774; 198/7.78
[51] Int. Cl.² .................................... B65G 25/04
[58] Field of Search .......... 198/774, 775, 776, 778

[56] References Cited

UNITED STATES PATENTS

| 2,933,179 | 4/1960 | Hirs | 198/774 |
| 3,599,782 | 8/1971 | Whitfield | 198/774 |
| 3,613,869 | 10/1971 | Schuricht | 198/778 |
| 3,850,287 | 11/1974 | Petros | 198/774 |

FOREIGN PATENTS OR APPLICATIONS

| 1,355,796 | 6/1974 | United Kingdom | 198/774 |

Primary Examiner—Evon C. Blunk
Assistant Examiner—Richard K. Thomson
Attorney, Agent, or Firm—Barnes, Kisselle, Raisch & Choate

[57] ABSTRACT

A storage and conveying unit having two helically shaped guideways on which workpieces are adapted to be supported in a position inclined slightly to the vertical. One of the guideways is mounted on an outer cylindrical support and the other guideway is mounted on an inner cylindrical support having a diameter slightly less than the diameter of the outer cylindrical support. The inner cylindrical support is reciprocated vertically through a short stroke to advance the workpieces in the direction of their inclination. The two cylindrical supports are provided with vertical guides and guide rollers engaging the guides for preventing relative circumferential movement between the two supports.

18 Claims, 7 Drawing Figures

HELICAL STORAGE AND CONVEYING UNIT

This invention relates to helical storage and conveying units for workpieces and, more particularly, to workpiece storage units having two vertically spaced, helically shaped guideways on which workpieces are supported, one of the guideways being stationary and the other being powered to oscillate vertically to thereby advance the workpieces upwardly or downwardly in a helical path.

Storage units of the type described are commonly used in industry for accommodating a supply of workpieces between successive machines which perform processing operations on the workpieces. Normally in such storage units the convolutions of the stationary guideway are supported on a stationary circular outer structure. The successive convolutions of the vertically oscillating guideway are disposed below and in vertical alignment with the successive convolutions of the stationary guideway and are supported by radial spoke-like members attached to a vertically extending shaft at the center of the circular structure, the shaft being reciprocated vertically by suitable means. The stationary guideway normally consists of two rails arranged to partially support the underside of an enlarged top portion of the workpiece and the oscillating guideway is arranged to engage and partially support the smaller lower end of the workpiece. The two sets of guideways are spaced apart vertically in relation to the size of the workpiece such that when the workpiece is supported by the two guideways it assumes an attitude inclined slightly to the vertical. Thus, when the central shaft is raised to lift the lower guideway, the enlarged upper end portion of the workpiece will slide along the top stationary guideway and the angle of its attitude will be increased. When the central shaft is lowered, the lower portion of the workpiece will slide along the bottom guideway until the workpiece again assumes its original angle of inclination. Thus, during one cycle of oscillation the workpiece is advanced one increment along both guideways in the direction of its inclination. The magnitude of oscillation is relatively small while the forward progress of the workpiece is relatively large due to the small angle of inclination of the workpiece. Continuous oscillations act to deliver an adequate supply of workpieces to furnish the requirements of the handling system. It will be noted that the conveyed part will travel in either direction depending on the direction of its inclination. Thus, when the guideways extend helically, the workpiece flow can be arranged to be either up or down in a helical path.

When workpieces are sliding on either guideway the frictional resistance between the workpiece and the guideway generates a force vector parallel to the two guideways. Since one of the guideways is fixed the reaction is taken by the oscillating guideway which, being supported on the central shaft, is applied to the shaft as a torsional force which must be restricted if the mechanism is to function properly. This torsional force is small when generated by a single workpiece, but when the storage unit is working close to its capacity, the weight generating these forces can be thousands of pounds and, thus, the magnitude of the torsion on the shaft can be very substantial. Because the shaft must reciprocate axially the forces tending to rotate the shaft are extremely hard to counteract. If the shaft is allowed to rotate even a small amount, this movement is amplified greatly because of the relatively large radial distance between the central shaft and the guideway and the workpiece will not advance or will advance very little. Many different solutions to the problem of restraining these torsional forces have been tried, but none have achieved an acceptable degree of satisfaction.

The primary object of this invention is to provide a powered helical storage and conveying unit of the type described having means thereon for torsionally stabilizing the vertically oscillating guideway in an effective and economical manner.

Another object of this invention is to provide means on a powered helical storage unit for easily and accurately aligning the two guideways relative to one another.

More specifically, in the helical storage unit of this invention the stationary helical guideway is mounted on a substantially cylindrical structure that rests on a floor structure in a manner similar to the prior art. Enclosed in the cylindrical structure is a substantially circular assembly supported at its lower center on a suitable bearing and a vertically extending connecting rod reciprocated by a powered eccentric to raise and lower the circular assembly. Torsional and radial guide rollers are arranged between the stationary cylindrical structure and the top and bottom of the internal circular assembly to restrict the circular assembly to vertical movement and simultaneously render it torsionally stable. The outer periphery of the inner circular assembly is in radially close proximity to the outer cylindrical structure on which the stationary guideway is mounted. The vertically reciprocating guideway is mounted on the outer ends of short radially extending members mounted on the inner circular assembly and extending through the outer cylindrical structure. Thus, when the powered eccentric is rotated the internal circular assembly will oscillate vertically and effect the up and down movement of the lower guideway. The torsional guide rollers located between the outer cylindrical structure and the internal circular assembly are subjected to relatively small torsional forces and, thus, render the internal assembly torsionally stable. The radial guide rollers are radially adjustable to shift the central axis of the internal assembly and, thus, accurately align the two sets of helical guideways, one directly above the other.

Other objects, features and advantages of the present invention will become apparent from the following description and accompanying drawings, in which.

Figure 2:
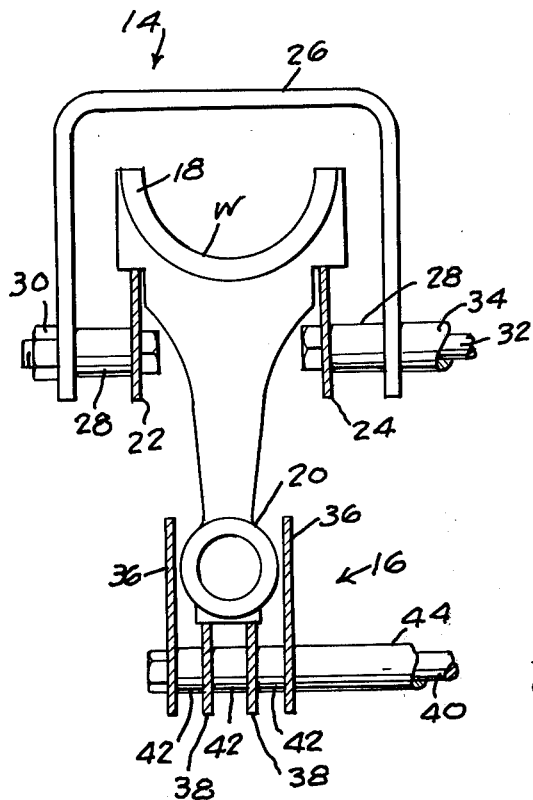
FIG. 2 is a sectional view through the two guideways of a storage unit embodying this invention and showing a typical workpiece.
Figure 1:
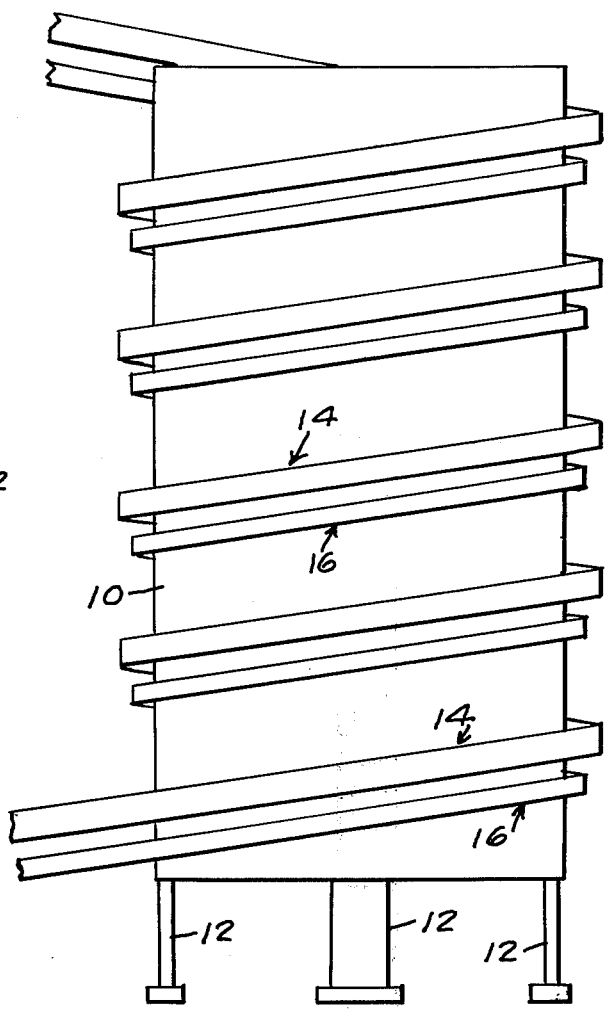
FIG. 1 is a diagrammatic view of a typical powered helical storage unit.
Figure 5:
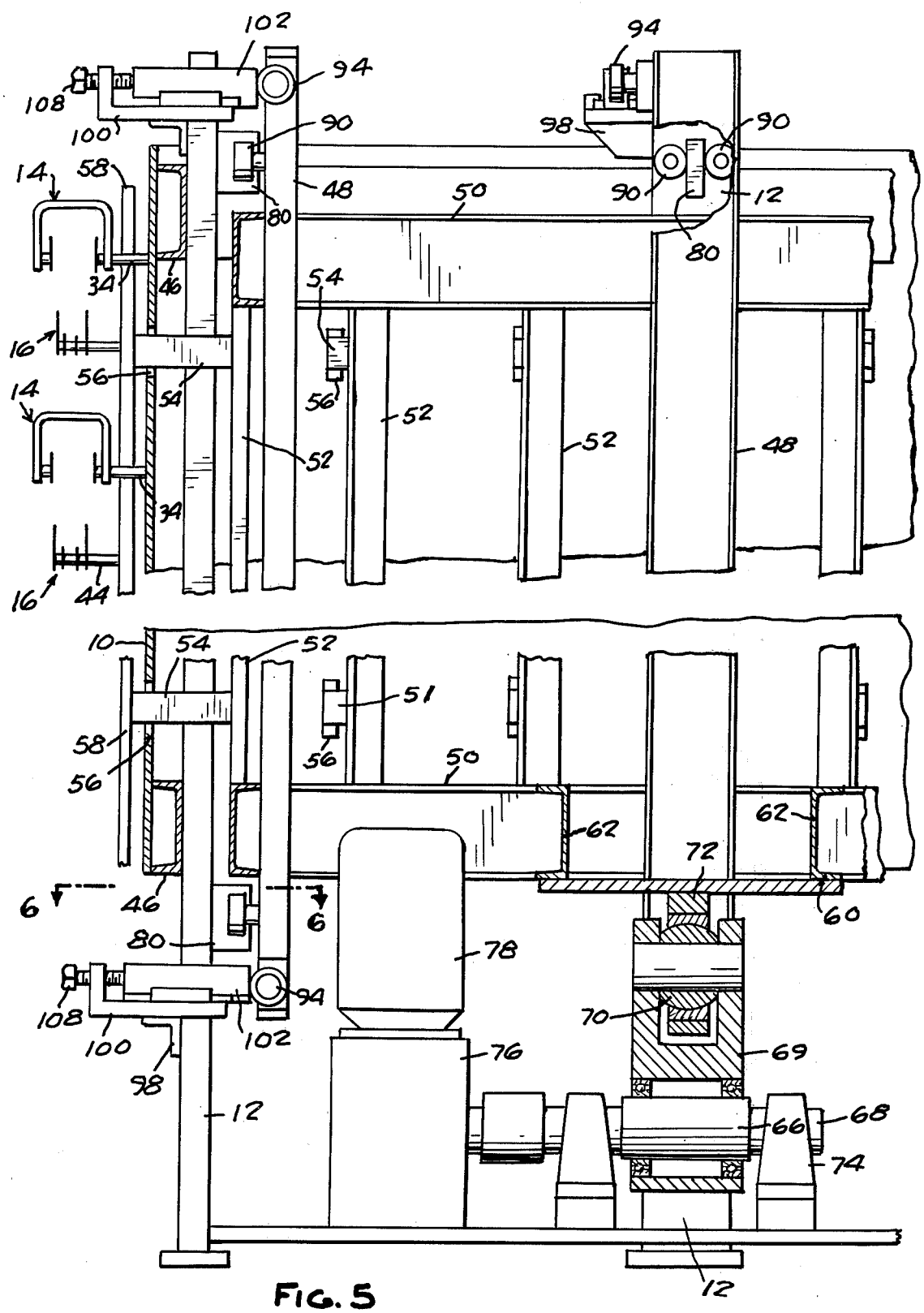
FIG. 5 is a fragmentary vertical sectional view of a powered helical storage unit incorporating the invention.

In FIG. 1 there is illustrated in a general way a helical storage unit of the present invention which comprises a cylindrical shell 10 supported by four vertically extending legs 12. Around shell 10 there is wrapped a pair of helical guideways 14, 16. A more detailed showing of these guideways is illustrated in FIG. 2. A power mechanism described with reference to FIG. 5 is employed for vertically oscillating guideway 14 through a small stroke for causing workpieces to be advanced upwardly or downwardly in the guideways.

In FIG. 2 the workpiece W illustrated is the main portion of a connecting rod of an internal combustion engine and is typical of the type of workpieces adapted to be handled by the storage unit of this invention. The connecting rod comprises an enlarged head 18 at its upper end and a smaller wrist pin bearing portion 20 at its lower end. Guideway 14 comprises a pair of helical carrier rails 22, 24 adapted to engage the head 18 of the workpiece as shown in FIG. 2. These two carrier rails are interconnected by an inverted U-shaped saddle strap 26. Rail 22 is mounted on strap 26 by a spacer 28 and a bolt and nut assembly 30. Rail 24 is supported on strap 26 by a similar spacer 28 and a bolt and nut assembly 32 by means of which guideway 14 is mounted on shell 10. Strap 26 is properly located in spaced relation to shell 10 by a spacer 34. The lower guideway 16 comprises a pair of spaced guide rails 36 and carrier rails 38 spaced apart on a bolt and nut assembly 40 by spacers 42. Bolt 40 is mounted on the vertically oscillating assembly of the carriage unit and rails 36, 38 are spaced therefrom by a spacer 44.

Figure 3:
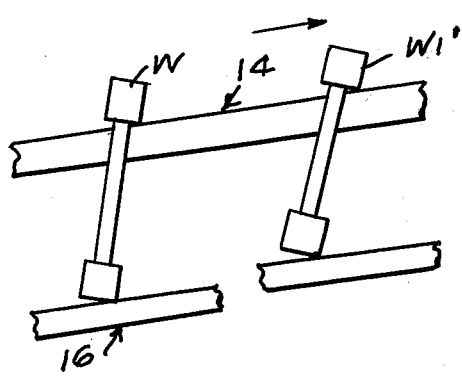
FIGS. 3 and 4 are diagrammatic views showing the progression of a workpiece and the movement of the bottom guideway.
Figure 4:
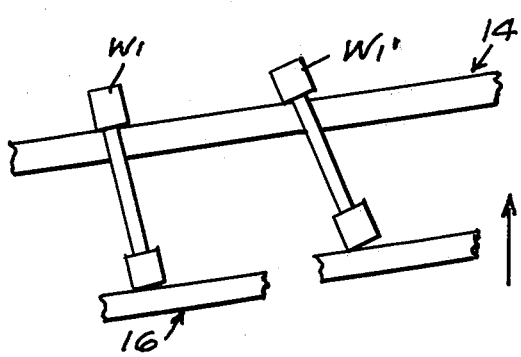

The manner in which a workpiece W is advanced along the guideways 14, 16 is illustrated in a generally diagrammatic way in FIGS. 3 and 4. When the workpiece is arranged on the guideways so that it is inclined in the direction of the upward inclination of the guideways as shown in FIG. 3, vertical reciprocation of guideway 16 causes the workpiece to travel upwardly along the guideways. More specifically, when guideway 16 is raised a slight amount workpiece W assumes a greater angle of inclination to the vertical (the position indicated W') by sliding up guideway 14. When guideway 16 is moved downwardly to its original position the lower end of the workpiece will slide up guideway 16, assuming its original attitude and the workpiece has, therefore, moved up the incline one increment of travel. The arrangement shown in FIG. 3 is used when the storage unit is loaded with workpieces at the bottom of the helical guideways and is utilized as an elevator as well as a storage receptacle.

In the arrangement illustrated in FIG. 4 the workpiece W1 is supported on the guideways so that it is inclined in a downward direction. Thus, when the guideway 16 is raised the workpiece assumes a greater angle of inclination to the vertical (the position indicated W1') so that the upper end thereof slides down on guideway 14. Thereafter, when guideway 16 lowers, the workpiece will again assume its original attitude and the lower end thereof will slide down guideway 16. The workpiece will thus have progressed downwardly one increment of travel. The orientation illustrated in FIG. 4 is used when workpieces are loaded from the top of the storage unit and removed from the bottom. The upper edges of the carrier rails may be formed or suitably treated to provide sufficient friction between these rails and the workpieces to prevent retrograde movement of the lower end of the workpiece when the lower guideway is raised.

FIG. 5 illustrates the detailed construction of the storage unit embodying this invention. As is apparent from this figure, the upright legs 12 may be formed as channels arranged in circular fashion and spaced apart circumferentially 90°. They are retained in this position by two channel-shaped circular rings 46 to which the cylindrical shell 10 is secured to form a rigid support structure. The bolts 32 and spacers 34 extend radially outwardly from shell 10. Only two sets of guideways 14, 16 are shown in FIG. 5, but it will be appreciated that in practice the number of convolutions of these helical guideways will be sufficient to satisfy the needs of a particular installation. In the embodiment illustrated legs 12 extend the full height of the storage unit. It will be appreciated that these legs can be short and the portions thereof extending between rings 46 may be formed as separate members.

The inner vertically oscillating support assembly on which the lower guideways 16 are mounted comprises a plurality of upright columns 48 which are arranged in a circle and radially aligned with the support leg columns 12. Columns 48 are fixedly secured to upper and lower rings 50 of channel cross section. A plurality of vertically extending columns 52 have their upper and lower ends rigidly secured to rings 50. Columns 52 are spaced apart circumferentially generally uniformly. Each column 52 has fixedly secured thereto at vertically spaced points a plurality of support brackets 54 which extend radially outwardly therefrom through slots 56 in shell 10. Vertically extending support bars 58 are fixedly attached to the outer ends of support brackets 54. The bolts 40 which support the lower guideway 16 are mounted on support bars 58, guideways 16 being properly positioned relative to support bars 58 by spacers 44.

The inner support which oscillates vertically and which generally consists of columns 48, 52 and rings 50 is vertically supported at its lower end. The support structure comprises a base plate 60 at the center of the inner support which is mounted on a pair of cross channels 62 on the lower ring 50. A connecting rod 64 is connected at its lower end to an eccentric 66 on a shaft 68 and at its upper end by a spherical bearing structure 70 to a bearing support 72 on the bottom side of base plate 60. Shaft 68 is journalled in pillow blocks 74 and is connected to the output of a speed reducer 76 driven by a motor 78. Rotation of shaft 68 causes the inner circular support assembly to oscillate vertically a short distance proportional to the eccentricity of eccentric 66.

Figure 6:
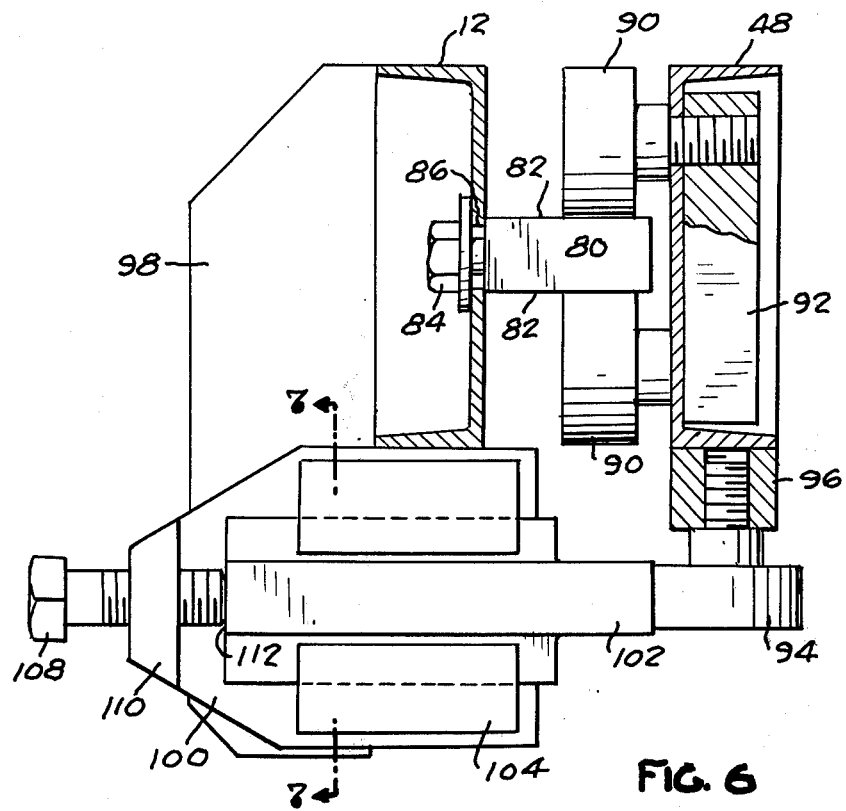
FIG. 6 is a sectional view along line 6—6 of FIG. 5.
Figure 7:
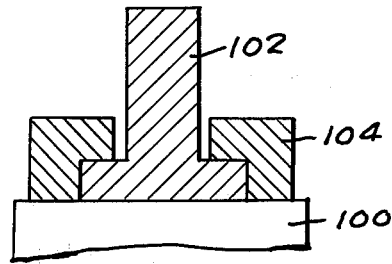
FIG. 7 is a sectional view along line 7—7 of FIG. 6.

The means for guiding the inner support structure vertically includes a pair of guide blocks 80 mounted adjacent the upper and lower ends of each support leg 12. As shown in FIG. 6, each guide block 80 has vertically extending parallel faces 82 and is mounted on the inner face of a leg 12 by means of a screw 84 extending through a horizontally elongated slot 86 in leg 12. The opposed flat faces 82 of each guide block 80 are engaged by guide rollers 90, the spindles of which are threaded into blocks 92 on the inside of upright columns 48. Since rollers 90 are in rolling contact with radially disposed faces 82 of guide blocks 80 they prevent columns 48 and the members fixed thereto from being displaced circumferentially relative to legs 12 and the members fixed thereto.

Rollers 94 are mounted by means of blocks 96 adjacent the upper and lower ends of each column 48. As shown in FIG. 6, the axes of rollers 90 are perpendicular to the axes of rollers 94. There is also mounted adjacent the upper and lower ends of legs 12 angled brackets 98, each of which supports the base plate 100 of an adjustable guide block 102. Each guide block 102 is guided for horizontal movement in a radial direction by means of retainers 104. Each roller 94 is in rolling engagement with the vertically extending face 106 at the radially inner end of a guide block 102. A screw 108 threaded through an upwardly extending bracket 110 at the outer end of base plate 100 is arranged to bear against the inner end face 112 of guide block 102.

Adjustment of guide blocks 80, 102 enables the entire reciprocating portion of the storage unit to be located such as to insure proper vertical alignment of guideways 14, 16 relative to each other. It will be noted that the lateral or circumferential position of guide blocks 80 can be changed by loosening screws 84 and at the same time adjusting the radial guide block 102 of one or both of the guide assemblies which are disposed at the same level as and spaced 90° from the guide block 80 being adjusted. After all of the helical guideways have been aligned by the adjustment of guide blocks 80 and 102, the bolts securing the guideways to their respective supports are firmly tightened to permanently secure the adjustment of the machine.

It will be observed that in the present arrangement there is no central shaft, as is the case with the prior art structures of this type. It will be noted that the relatively large torsional forces generated by the sliding action of the workpieces in the respective guideways is absorbed by the many rollers 90, 94 which are located at a relatively large radial distance from the central axis of the storage unit. Note, for example, that rollers 90, 94 and active faces of guide blocks 80, 102 are located radially adjacent the inner ends of support brackets 54 and that the radius of the circle defined by bars 52 is more than five times the length of support brackets 54. This roller structure therefore effectively absorbs the torsional forces generated even though the storage unit may be of relatively large diameter. These rollers are located generally in the annular space between the outer stationary structure and the inner vertically reciprocating structure. Since this space is of short radial extent, the rollers and guides are capable of absorbing the reaction forces without appreciable deflection of any of the components.

I claim:

1. A helical storage and conveying unit comprising, means forming an upright, generally cylindrical outer support, means forming an upright, generally circular inner support disposed within said outer support and having its outer periphery in proximate radial relation to the outer support, a helical guideway supported on and extending around said outer support, a plurality of radially extending support brackets mounted on said inner support and extending through said outer support, a helical guideway mounted on the outer ends of said suppport brackets, the convolutions of said two guideways being vertically aligned and alternately spaced, means for reciprocating the inner support vertically and vertically extending guides on one of said supports and guide rollers on the other support engaging said guides, said guides cooperating with said guide rollers for preventing relative circumferential motion between said supports and guideways.

2. A helical storage and conveying unit as called for in claim 1 wherein said guide rollers are journalled on axes extending generally radially of said supports.

3. A helical storage and conveying unit as called for in claim 1 wherein said vertical guides and guide rollers are disposed generally in the annular space between the inner and outer supports.

4. A helical storage and conveying unit as called for in claim 1 wherein said guides and guide rollers are spaced circumferentially around said supports and are disposed adjacent the upper and lower ends thereof.

5. A helical storage and conveying unit as called for in claim 1 wherein said guides extend radially inwardly from the outer support and said guide rollers project radially outwardly from said inner support.

6. A helical storage and conveying unit as called for in claim 1 wherein said guides are mounted on one of said supports for adjustment circumferentially of the support.

7. A helical storage and conveying unit as called for in claim 2 including additional guide rollers journalled on one of said supports on axes extending generally perpendicular to the axes of the first-mentioned guide rollers and additional guides on the other support engaged by the additional guide rollers for maintaining the central vertical axis of the inner support in fixed relation to the outer support.

8. A helical storage and conveying unit as called for in claim 7 wherein said additional guide rollers or the additional guides are radially adjustable to permit axial alignment of the convolutions of the two guideways.

9. A helical storage and conveying unit as called for in claim 8 wherein the first-mentioned guide rollers or guides are mounted on one of said supports for adjustment circumferentially of the support.

10. A helical storage and conveying unit as called for in claim 9 wherein said inner and outer supports each include at least three vertically extending columns, the columns on the outer support being radially aligned with the columns on the inner support, said guides and guide rollers being mounted on said columns.

11. A helical storage and conveying unit as called for in claim 9 wherein said inner and outer supports each include at least four vertically extending columns spaced 90° apart circumferentially, the columns on the outer support being radially aligned with the columns on the inner support, said guides and guide rollers being mounted on said columns.

12. A helical storage and conveying unit as called for in claim 11 wherein the guide rollers are mounted on the column of the inner support and the guides are mounted on the columns of the outer support.

13. A helical storage and conveying unit as called for in claim 1 wherein said outer support includes a rigid cylindrical shell, said support brackets extending through vertically slotted portions of said shell.

14. A helical storage and conveying unit as called for in claim 7 wherein the first- and second-mentioned guides are mounted on and project radially inwardly from said outer support and the first- and second-mentioned guide rollers are mounted on and project radially outwardly from the inner support.

15. A helical storage and conveying unit as called for in claim 14 wherein the radial spacing between the outer periphery of the inner support and said guideways is relatively small in comparison to the radius of the inner support.

16. A helical storage and conveying unit as called for in claim 14 wherein the length of said support brackets in a radial direction is relatively small in comparison to the radius of the inner support.

17. A helical storage and conveying unit as called for in claim 14 wherein the radius of the inner support is at least five times the length of said support brackets in a radial direction.

18. A helical storage and conveying unit as called for in claim 16 wherein the inner ends of said support brackets lie on a circle which is concentric to and has a diameter corresponding generally to the diameter of the circle defined by said guide rollers.

* * * * *